US008804382B2

(12) United States Patent
Stone et al.

(10) Patent No.: US 8,804,382 B2
(45) Date of Patent: Aug. 12, 2014

(54) RESONANT CONTROLLER CIRCUIT AND SYSTEM WITH REDUCED PEAK CURRENTS DURING SOFT-START

(75) Inventors: John D. Stone, Tempe, AZ (US); Jefferson W. Hall, Chandler, AZ (US)

(73) Assignee: Semiconductor Components Industries, LLC, Phoenix, AZ (US)

( * ) Notice: Subject to any disclaimer, the term of this patent is extended or adjusted under 35 U.S.C. 154(b) by 719 days.

(21) Appl. No.: 12/954,086

(22) Filed: Nov. 24, 2010

(65) Prior Publication Data
US 2012/0126765 A1 May 24, 2012

(51) Int. Cl.
H02M 1/088 (2006.01)
H02M 1/36 (2007.01)
H02M 3/158 (2006.01)
H02M 1/096 (2006.01)

(52) U.S. Cl.
CPC .............. *H02M 3/1588* (2013.01); *H02M 1/36* (2013.01); *Y02B 70/1466* (2013.01)
USPC ................................ 363/49; 363/26; 363/127

(58) Field of Classification Search
USPC .......... 363/49, 123–127, 25–26, 56.03, 56.05
See application file for complete search history.

(56) References Cited

U.S. PATENT DOCUMENTS

| 5,359,281 | A |  | 10/1994 | Barrow et al. |
|---|---|---|---|---|
| 5,426,350 | A |  | 6/1995 | Lai |
| 5,546,300 | A |  | 8/1996 | Lee et al. |
| 5,699,238 | A |  | 12/1997 | Lee et al. |
| 5,796,215 | A |  | 8/1998 | Parry et al. |
| 6,137,702 | A | * | 10/2000 | Hall et al. ......................... 363/95 |
| 6,154,375 | A |  | 11/2000 | Majid et al. |
| 6,285,569 | B1 | * | 9/2001 | Hall et al. .................... 363/21.15 |
| 6,480,043 | B2 | * | 11/2002 | Hall et al. ....................... 327/108 |
| 6,756,771 | B1 | * | 6/2004 | Ball et al. ........................ 323/222 |
| 7,477,532 | B2 | * | 1/2009 | Hall et al. ......................... 363/49 |
| 7,583,522 | B2 | * | 9/2009 | Hall et al. ......................... 363/95 |
| 7,623,361 | B2 | * | 11/2009 | Basso et al. ...................... 363/49 |
| 2007/0041227 | A1 | * | 2/2007 | Hall et al. ......................... 363/49 |

OTHER PUBLICATIONS

On Semiconductor; High Performance Resonant Mode Controller with Integrated High-Voltage Drivers; Reference Manual; Apr. 2010; pp. 1-27; NCP1397/D; Semiconductor Components Industries, LLC; Denver, Colorado, US.

On Semiconductor; High Performance Resonant Mode Controller featuring High-Voltage Drivers; Reference Manual; Feb. 2009; pp. 1-25; NCP1396D; Semiconductor Components Industries, LLC; Denver, Colorado, US.

On Semiconductor; High Performance Resonant Mode Controllers; Data Sheet; Jan. 2002; pp. 1-17; MC34067/D; Semiconductor Components Industries, LLC; Denver, Colorado, US.

(Continued)

*Primary Examiner* — Adolf Berhane
*Assistant Examiner* — Nusrat Quddus
(74) *Attorney, Agent, or Firm* — Polansky & Associates, P.L.L.C.

(57) ABSTRACT

A circuit includes a first control output adapted to couple to a control terminal of a first transistor and a second control output adapted to couple to a control terminal of a second transistor. The circuit further includes a feedback input for receiving a signal and a control circuit. The control circuit is configured to independently control first and second on-times of control signals applied to the first and second control outputs, respectively, in response to receiving the signal to limit a current at an output node.

26 Claims, 8 Drawing Sheets

(56) References Cited

OTHER PUBLICATIONS

John Day, Keith Curtis, and Microchip Technology Inc.; Soft-Start Controller for Switching Power Supplies; Technical Brief; 2004; 6 pages; TB081, DS91081A; Microchip Technology Inc., Chandler, Arizona, US.

Siemens; Switching Devices: Soft Starters, Semiconductor Switching Devices, Control Devices, AS-I; Catalog; 2004; excerpt of pp. 1-7 of 112; Siemens LV 10; Siemens, New York, New York, US.

* cited by examiner

RESONANT CONTROLLER CIRCUIT AND SYSTEM WITH REDUCED PEAK CURRENTS DURING SOFT-START

FIELD

The present disclosure is generally related to switching power supplies, and more particularly to switching power supplies with soft-start functionality.

BACKGROUND

When first turned on, many electronic devices consume a transient peak current, which can cause voltage fluctuations and affect the performance of other circuits connected to a common power supply. The transient peak current is sometimes referred to as an inrush current. In switching power regulators, including those with bridge type power stages, charging of gate capacitances, bridge capacitances, and reactive loads can introduce these transient peak currents during startup, stressing or damaging associated circuitry, if such peak currents are not adequately controlled. Generally, switching power regulators include soft-start circuitry configured to suppress the transient peak currents by controlling the charging rates of any reactive elements.

One technique for controlling such peak currents includes biasing the switching field effect transistors (FETs) into their linear region. Controlling the FETS in this manner reduces the peak currents, but applies undesirable stress to the FETs. Further, in this technique, the switching power supply does not operate properly at higher power levels without expensive, high power FETs.

Another technique for controlling peak currents uses a frequency ramp soft-start method where the frequency of drive pulses for controlling the FETs decreases over time from a high frequency down to an operating frequency level. Unfortunately, this technique still introduces a large current spike on start up that is dependent on the size of the resonant capacitor and on the charge stored by the resonant capacitor on startup. If the resonant capacitor is large and/or there is no stored charge, the current spike will also be large as the resonant capacitor charges.

Still another technique for controlling such peak currents involves increasing the amplitudes of the gate drive signals of the switching FETs. In this method, the gate voltages of the high-side and low-side FETs are slowly increased with each cycle. The low-gate voltage for each turn on cycle makes the FETs more resistive and slowly ramps the inductor current. However, cyclically increasing the gate amplitudes can cause overdissipation on the FETs and reliability issues and may not work in some applications.

SUMMARY

In an embodiment, a circuit includes a first control output adapted to couple to a control terminal of a first transistor and a second control output adapted to couple to a control terminal of a second transistor. The circuit further includes a feedback input for receiving a signal and a control circuit. The control circuit is configured to independently control first and second on-times of control signals applied to the first and second control outputs, respectively, in response to receiving the signal to limit a current at an output node.

In another embodiment, a system includes an output node and a first transistor having a first current electrode coupled to a first power supply terminal, a control electrode, and a second current electrode coupled to the output node. The circuit further includes a second transistor having a first current electrode coupled to the output node, a control electrode, and a second current electrode coupled to a second power supply terminal. The circuit also includes a controller having a feedback input coupled to the output node, a first output coupled to the control electrode of the first transistor, and a second output coupled to the control electrode of the second transistor. The controller detects a signal at the output node and independently controls at least one of the first transistor and the second transistor in response to the signal to limit a current at the output node.

In yet another embodiment, a method includes selectively applying one of a first drive signal to a first connection coupled to a control electrode of a first transistor and a second drive signal to a second connection coupled to a control electrode of a second transistor. The first transistor includes a first current electrode coupled to a first power supply terminal and a second current electrode coupled to an output node. The second transistor includes a first current electrode coupled to the output node and a second current electrode coupled to a second power supply terminal. The method further includes measuring a signal related to a current at the output node and selectively controlling at least one of the first drive signal and the second drive signal to independently control on times of the first and second transistors in response to measuring the signal.

BRIEF DESCRIPTION OF THE DRAWINGS

In the following description, the use of the same reference numerals in different drawings indicates similar or identical items.

DETAILED DESCRIPTION OF ILLUSTRATIVE EMBODIMENTS

In resonant controllers, a soft-start circuit prevents the sudden application of relatively high or potentially destructive currents into a resonating circuit. Conventionally, control circuitry charges a soft-start capacitor and utilizes the capacitor voltage to produce a modulated oscillation frequency. In particular, the charging current causes the controller to decrease the operating frequency to a pre-determined frequency level. As the soft-start capacitor charges, the control circuit decreases the operating frequency. However, the frequency method of soft-start can produce large current spikes at the beginning of the startup process depending on the charge stored by the resonant capacitor on startup. If the capacitor happens to start at ground, and the high and low-side drive signals have the same on-time, then the current will increase faster in response to the high-side drive signal than it can discharge in response to the low-side drive signal. This produces a large, successively increasing current until the voltage across the resonant capacitor reaches a mid-rail voltage level.

Embodiments of systems and methods described below independently control the on-times of the high and low-side FETs, during each cycle, to prevent cycle-by-cycle current build up and to limit a peak current. Embodiments of a circuit are configured to control the on-times of the high-side FET and/or the low-side FET to ensure that the discharge of the low-side FET and/or the charge of the high-side FET at least reaches a threshold current level (such as a zero current level). In this way, the current does not build up from one cycle to the next, but rather returns at least to a pre-determined threshold level when each FET is on before the next cycle begins. Further, the on-times are controlled to ensure that the discharge of the current during the low-side FET on time does not fall below a negative current level and the charge of the current during the high-side FET on time does not exceed a positive current level. By independently controlling the on-times of the high and low-side FETS (i.e., by independently controlling the pulse widths of the high and low-side drive signals), the current peak into the load can be controlled.

To understand how independent control of the high and low-side drive signals can impact the current into the load, the following discussion introduces a half of an H-bridge circuit coupled to an inductive/capacitive load to explain how the high and low-side drive signals control the current driven into the load. An example of such a circuit is described below in FIG. 1.

Figure 1:
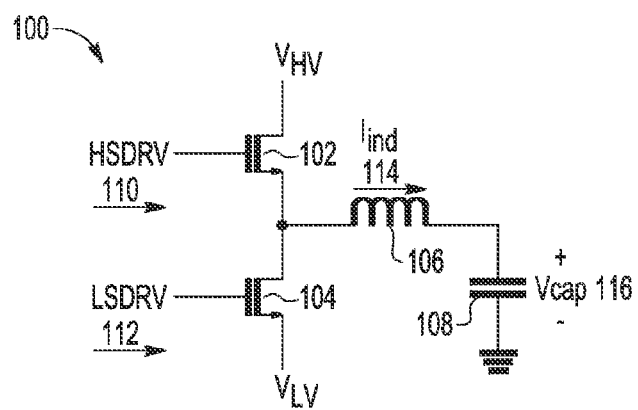
FIG. 1 is a simplified schematic diagram of a portion of a circuit including half of an H-bridge for driving an inductive load and for charging a resonant capacitor.

FIG. 1 is a simplified schematic diagram of a portion of a circuit 100 including half of an H-bridge for driving an inductive/capacitive load. Circuit 100 includes a transistor 102 (high-side transistor) including a drain connected to a first power supply terminal (such as a positive or relatively high voltage supply terminal ($V_{HV}$)), a gate, and a source. Circuit 100 also includes a transistor 104 (low-side transistor) having a drain connected to the source of transistor 102, a gate, and a source connected to a second power supply terminal (such as a negative or relatively low voltage supply terminal ($V_{LV}$) or ground). While transistors 102 and 104 are depicted as N-channel metal oxide semiconductor field effect transistors (MOSFETs), in other embodiments, transistors 102 and 104 can be implemented as P-channel MOSFETs, or bipolar junction transistors (BJTs), among others.

Circuit 100 includes an inductor 106 having a first terminal connected to the source of transistor 102 and the drain of transistor 104 and a second terminal. Circuit 100 further includes a capacitor 108 including a first electrode connected to the second terminal of inductor 106 and a second electrode connected to ground. Capacitor 108 charges based on the inductor current ($I_{ind}$) 114 and stores a capacitor voltage (Vcap) 116.

In operation, a control circuit (not shown) applies a high-side drive signal 110 to the gate of transistor 102 to control current to flow through transistor 102 and applies a low-side drive signal 112 to the gate of transistor 104 to control current flow through transistor 104. The current through transistor 102 flows into inductor 106 as inductor current ($I_{ind}$) 114, charging capacitor 108 to a capacitor voltage (Vcap) 116. After a period of time, the control circuit applies the high-side drive signal 110 to control current flow through transistor 102 and applies the low-side drive signal 112 to control current flow through transistor 104, decreasing the inductor current ($I_{ind}$) 114.

In a frequency-based soft-start system, the switching frequency of the high-side drive signal 110 and the low-side drive signal 112 decreases over time from the initial startup, gradually increasing the capacitor voltage (Vcap) 116. However, the inductor 106 resists changes in the flow of inductor current ($I_{ind}$) 114. If the on-times of the high-side drive signal 110 and the low-side drive signal 112 are substantially equal, the inductor current ($I_{ind}$) 114 can successively increase with each switching cycle. In particular, if the inductor current ($I_{ind}$) 114 does not reach a zero current level while transistor 104 is active, when transistor 102 is activated, the current flowing through transistor 102 will aggregate with the existing inductor current ($I_{ind}$) 114, causing the inductor current ($I_{ind}$) 114 to increase over time. This increasing current can stress associated circuitry, potentially to damaging levels. In embodiments of the invention described below, the on-times are controlled such that the on-time of the low-side drive signal 112 is different from that of the high-side drive signal 110 to ensure that the inductor current ($I_{ind}$) 114 reaches a zero current level or another pre-determined level before switching transistors 102 and 104.

As previously mentioned, the conventional frequency method of soft-start can cause the inductor current to increase rapidly over time. An example of a timing diagram depicting the increasing inductor current ($I_{ind}$) 114 is described below with respect to FIG. 2.

Figure 2:
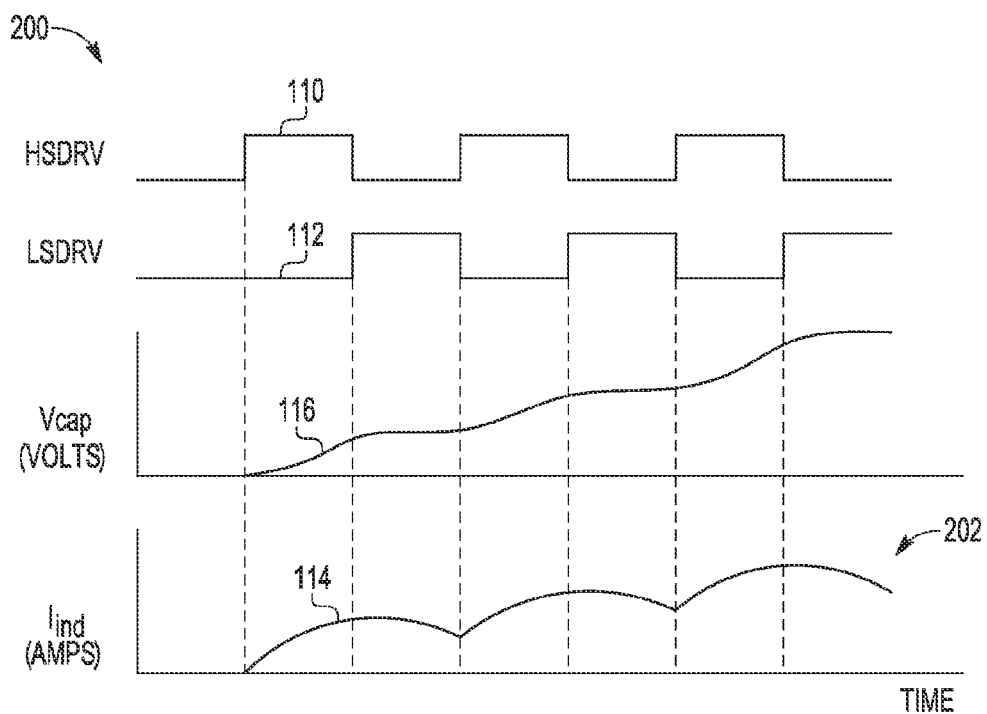
FIG. 2 is a timing diagram of the high-side drive signal, the low-side drive signal, the voltage across a resonant capacitor, and an inductor current in the circuit of FIG. 1 driven with high and low-side drive signal having the same on-times.

FIG. 2 is a timing diagram 200 of the high-side drive signal 110, the low-side drive signal 112, the capacitor voltage 116, and the inductor current 114 in the circuit of FIG. 1 driven with high-side drive signal 110 and low-side drive signal 112 having the same on-times. High-side drive signal 110 includes a sequence of pulses having widths that are modulated to control the on-time of transistor 102. Low-side drive signal 112 includes a corresponding sequence of pulses that is substantially an inverted version of the high-side drive signal 110. For zero voltage switching and to substantially reduce shoot through current in the transistors, additional delay circuitry may be included to introduce delays in the low-side drive signal 112 relative to the high-side drive signal 110.

Capacitor voltage 116 and inductor current ($I_{ind}$) 114 are shown to begin increasing with a first rising edge of the high-side drive signal 110. With the falling edge of the high-side drive signal 110, the low-side drive signal 112 increases to a logic-high level, and both the rate of increase of the capacitor voltage (Vcap) 116 and the level of the inductor current ($I_{ind}$) 114 start to decrease. However, when the low-side transistor 104 is active, the inductor current ($I_{ind}$) 114 decreases more slowly than it increases when transistor 102 is active. Thus, the inductor current ($I_{ind}$) 114 gradually increases over time with each cycle of the high and low-side drive signals 110 and 112. In FIG. 2, the inductor current ($I_{ind}$) 114 and the capacitor voltage (Vcap) 116 rates of change are exaggerated for illustration purposes. It should be understood that cycle-to-cycle changes actually occur gradually over many cycles. At some future point in time (not shown), the capacitor voltage 116 reaches a mid-rail voltage level or some other pre-determined voltage level. Unfortunately, the peak currents in the inductor 106 due to the net increase in current each cycle can stress associated circuitry, as noted. An example of the high peak currents due to such equal on-times in a frequency method of soft-start is described below with respect to FIG. 3.

Figure 3:
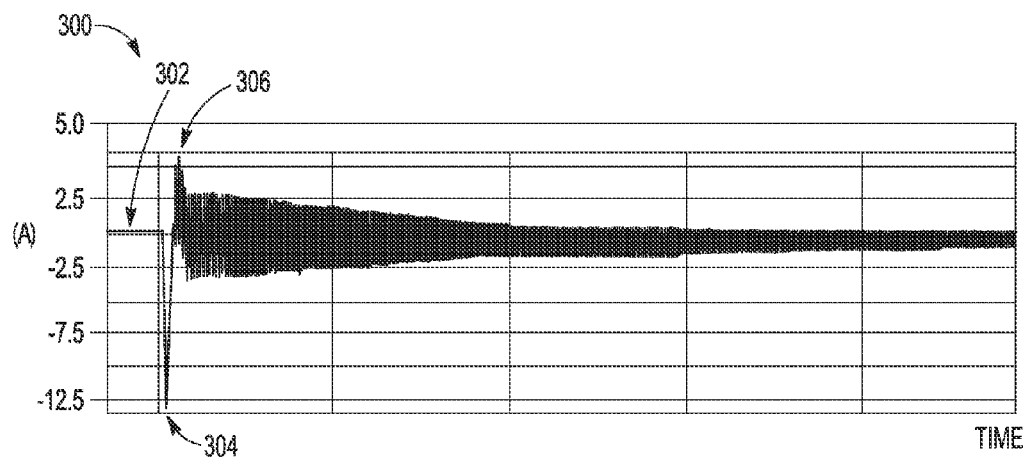
FIG. 3 is a graph of a representative example of output current versus time for a circuit, such as the circuit of FIG. 1, driven using high and low-side drive signals that have the same on-time to provide a soft-start frequency ramp.

FIG. 3 is a graph 300 of a representative example of output current versus time for a circuit, such as the circuit of FIG. 1, driven using high-side and low-side drive signals that have substantially the same on-time to provide a soft-start frequency ramp. In this example, the capacitor voltage (Vcap) 116 is initially at a relatively high (non-discharged) level as a result of the power stage having been previously in a state of power delivery, followed by having been turned off. At 302, inductor current ($I_{ind}$) 114 is at a zero current level. Prior to 304, the startup process is initiated, producing a very large current spike at 304 due to the decreasing cycle-by-cycle current peaks. The current spike occurs because the current decrease during the on-time of the low-side transistor 104 is greater than the current increase during the on-time of the high-side transistor 102 making a negative current spike until capacitor 108 is charged to its normal operating level. The resulting current spike has an absolute value peak current level of more than 12.5 Amps (i.e., less than a negative 12.5 Amps) in one particular prior art design embodiment. Inductor current ($I_{ind}$) 114 then increases to a current level of more than approximately 5 Amps (at 306) before settling into a stable oscillating current that gradually decreases from plus or minus 2.6 Amps to approximately plus or minus 1 Amp as the capacitor 108 charges to its steady state value.

Unfortunately, the initial peak currents at 304 and 306 stress the associated circuitry, and can damage such circuitry. Further, such peak currents necessitate over-sized (over-rated) system components, rated to withstand such peak currents without sustaining damage. Such over-sized (over-rated) system components increase the overall costs of the circuitry.

If the resonant capacitor voltage (Vcap) 116 starts at ground and switching starts with both the high-side drive signal 110 and the low-side drive signal 112 with equal on-times, then the voltage on the inductor is much higher when the transistor 102 is turned on than when the transistor 104 is turned on. As a result, the inductor current ($I_{ind}$) 114 increases with each switching cycle until Vcap 116 is charged to the normal operating level, resulting in a positive current peak of a magnitude similar to that at 304.

Thus, when transistors 102 and 104 are controlled to have the same on-times, inductor current ($I_{ind}$) 114 can increase to a current level that can damage associated circuitry. To avoid such a current build up, the pulse width of the low-side drive signal 112 can be controlled independently of the high-side drive signal 110 to increase or decrease the on-time of transistor 104 such that during a next pulse of the high-side drive signal 110, the peak of the inductor current ($I_{ind}$) 114 does not continue to increase. In one instance, a control circuit controls the pulse width of the low-side drive signal 112 to extend the on-time of transistor 104 until a pre-determined current level of inductor current ($I_{ind}$) 114 is reached. An example of a timing diagram for independent control of the on-times of the high side and low side transistors is described below with respect to FIG. 4.

Figure 4:
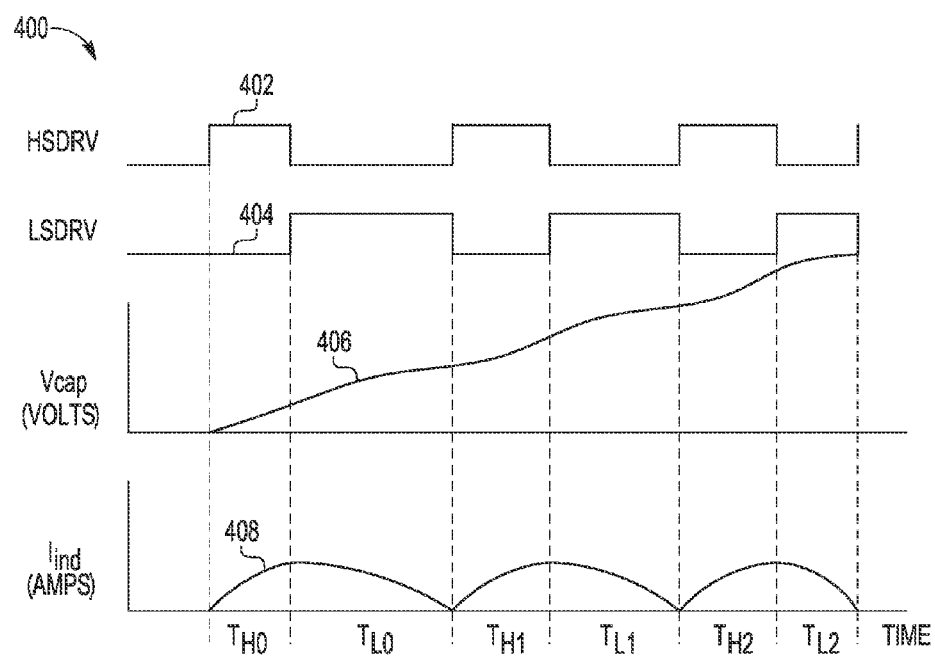
FIG. 4 is a timing diagram of a high-side drive signal, a low-side drive signal, a voltage across the resonant capacitor, and the inductor current in the circuit of FIG. 1 driven with high and low-side drive signals with independently variable on-times.

FIG. 4 is a timing diagram 400 of a high-side drive signal 402, a low-side drive signal 404, a capacitor voltage (Vcap) 406, and an inductor current ($I_{ind}$) 408 in the circuit of FIG. 1 driven with high-side and low-side drive signals with independently variable on-times according to the present invention. It should be understood that the high-side drive signal 402, the low-side drive signal 404, the capacitor voltage (Vcap) 406, and the inductor current ($I_{ind}$) 408 correspond to the high-side drive signal 110, the low-side drive signal 112, the capacitor voltage (Vcap) 116, and the inductor current (Iind) 114 described with respect to FIGS. 1-3; however, they are renumbered in FIG. 4 and subsequently to differentiate equal on-time high-side and low-side drive signals 110 and 112 and the resulting capacitor voltage 116 and inductor current ($I_{ind}$) 114 of the prior art from the independently variable on-times of high-side and low-side drive signal 402 and 404 and the resulting capacitor voltage 406 and inductor current 408 of the present invention.

In the illustrated example, when the high-side drive signal 402 is high, the low-side drive signal 404 is low. In actuality, there is a very short duration when both the low-side drive signal 404 and the high-side drive signal 402 are low between at least some of the pulses; however, such periods are omitted from the drawing for ease of discussion. During a first high signal time ($T_{H0}$), high-side drive signal 402 is at a logic high level, causing current flow through transistor 102 and through inductor 106, charging the capacitor 108. Capacitor voltage 406 increases at a first rate, and the inductor current 408 increases at a second rate. During a first low signal time ($T_{L0}$), low-side drive signal 404 is at a logic high level, causing current to flow through transistor 104. During this period, the rate of charging of the capacitor voltage 406 decreases as the inductor current decreases to a zero current level. In this example, when the inductor current 408 reaches the zero current level, the slope of the capacitor voltage rate of change is zero. If the inductor current were to fall below the zero current level, the capacitor voltage 406 would begin to decrease, and the capacitor voltage graph would show a negative slope during such an interval. In the illustrated example, the first low signal time ($T_{L0}$) is greater than the first high signal time ($T_{H0}$), allowing time for inductor current 408 to decrease to zero before application of the next high signal time ($T_{H1}$) (i.e., before the beginning of the next cycle).

In this instance, when inductor current 408 reaches a zero current level, the control circuit applies high and low-side drive signals 402 and 404 to the gates of transistors 102 and 104 to allow current flow through transistor 102 and to turn off current flow through transistor 104. During time $T_{H1}$, capacitor voltage 406 increases and inductor current 408 also increases. During time $T_{L1}$, the rate of charging of the capacitor voltage 406 decreases once again as inductor current 408 decreases to the zero current level. While the capacitor voltage 406 is shown to increase substantially over three pulses, it should be understood that the capacitor voltage 406 and the inductor current 408 are exaggerated in FIG. 4 to illustrate the point that the capacitor continues to charge controllably even when the inductor current 408 is returned to the zero current level between each cycle. Thus, over a sequence of pulses, capacitor voltage 406 increases, and the inductor current varies within a current range. In another embodiment, the capacitor voltage 406 may be initially charged and the system may operate using a high side detection scheme, changing the high-side and low-side drive signals 402 and 404 such that they would be substantially interchanged. Further, while the example of FIG. 4 describes a zero crossing threshold, it should be appreciated that other thresholds may be used that are offset from the zero current level. While the able example suggests a fixed current threshold, in another embodiment, a control circuit may adjust the threshold levels dynamically during the soft-start process.

The pulse width of the high-side drive signal 402 does not have to remain constant. As the voltage on the resonant capacitor 108 increases, the high-side drive signal 402 can stay on longer to achieve the same peak current. The pulses of high-side drive signal 402 continue to get wider until the operating frequency is reached or until the maximum on time of the high side drive is reached (often half of the normal operating period). In the illustrated example, the portion of the high-side drive signal 402 that is shown appears to be constant, but the on time of the high side pulses vary to allow time for the inductor current 406 to reach a pre-determined level before the next low-side drive signal pulse. In another embodiment, the pulse widths of the low-side drive signal 404 can be varied to reach the pre-determined level. In another alternative embodiment, the pulse widths of both the high and low-side drive signals 402 and 404 can be varied independently.

In the illustrated example, the capacitor voltage (Vcap) starts at a zero volt level. Low-side drive signal 404 is allowed to stay on longer than the high-side drive signal 402, allowing low-side transistor 104 to conduct current for longer than transistor 102, providing more time for the inductor current $(I_{ind})$ 408 to discharge. In this case, inductor current $(I_{ind})$ 408 is allowed to discharge to a zero current level; however, any low-side on-time that allows a net charging of the capacitor voltage (Vcap) 406 of the capacitor 108 without substantially increasing the inductor current $(I_{ind})$ 408 (over switching cycles) can be selected. The zero current detect threshold provides one possible convenient current level for achieving the net charging of the capacitor 108 without increasing the inductor current $(I_{ind})$ 408 over multiple cycles. However, it should be appreciated that other current levels may also work. In a particular example, a non-zero current level, such as plus or minus 50 mA, is used as the switching threshold. In some instances, it may be desirable to use a threshold indicative of a switching transition occurring later in time than that indicated by inductor zero current crossing, such that zero voltage switching occurs.

In the conventional, equal on-time implementation, the frequency method of soft-start can produce reasonably high peak current spikes. However, even with an initially low resonant capacitor voltage (Vcap), the soft-start method described in FIG. 4 above controls and reduces the absolute value of the peak current level. An example of a resonant controller configured to independently control the high-side and low-side on times to control the inductor current (Iind) 408 is described below in FIG. 5.

Figure 5:
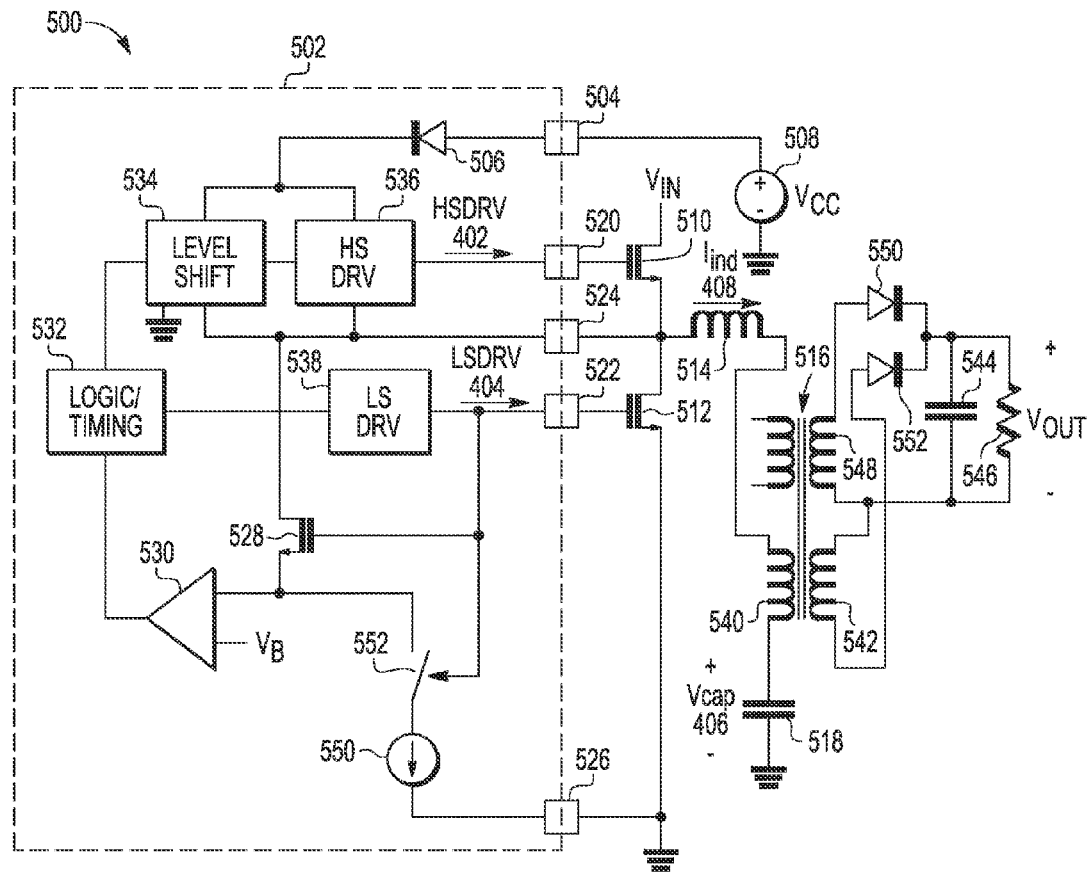
FIG. 5 is a partial block diagram and partial schematic diagram of a system including a circuit with soft-start functionality, according to the timing diagram of FIG. 4, coupled to half of an H-bridge configured to drive an inductive/capacitive load.

FIG. 5 is a partial block diagram and partial schematic diagram of a system 500 including a circuit 502, with soft-start functionality, coupled to half of an H-bridge configured to drive an inductive/capacitive load. System 500 includes a transistor 510 having a drain connected to a first voltage terminal ($V_{IN}$), a gate, and a source. System 500 further includes a transistor 512 having a drain connected to the source of transistor 510, a gate, and a source connected to ground. System 500 also includes an inductor 514 having a first terminal connected to the source of transistor 510 and the drain of transistor 512 and a second terminal connected to a first terminal of a primary winding 540 of a transformer 516. Primary winding 540 includes a second terminal connected to a first electrode of a capacitor 518, which has a second electrode connected to ground. Transformer 516 further includes winding 542 and winding 548, which are coupled through a magnetic core to primary winding 540. Winding 548 includes a first terminal connected to an anode of diode 550 and a second terminal connected to ground. Winding 542 includes a first terminal connected to ground and a second terminal connected to an anode of diode 552. Diodes 550 and 552 include cathodes connected to a first electrode of a capacitor 544, which has a second electrode connected to ground. Additionally, resistor 546 is connected in parallel with capacitor 544. A voltage across resistor 546 represents the output voltage ($V_{OUT}$) and the resistor 546 represents the load on the power converter. Further, system 500 includes a voltage source ($V_{CC}$) 508 connected to an anode of a diode 506, which includes a cathode connected to an electrically conductive pin or pad 504. Transistors 510 and 512 together represent a half-bridge resonant load drive circuit, inductor 514, primary winding 540 and capacitor 518 represent the resonant load circuit, and circuit 502 is a resonant controller.

Circuit 502 includes pads 520, 522, 524, and 526. Pad 520 connects circuit 502 to the gate of transistor 510. Pad 522 connects circuit 502 to the gate of transistor 512. Pad 524 is a bridge node feedback input that connects circuit 502 to the source of transistor 510, the drain of transistor 512, and the first terminal of inductor 514. Pad 526 connects circuit 502 to ground and to the drain of transistor 512.

Circuit 502 further includes a high-side driver circuit 536 having a first input connected to pad 504, a second input connected to pad 524, and an output connected to pad 520. Circuit 502 also includes a level shift circuit 534 including a first input connected to pad 504 through diode 506, a second input connected to pad 524, a first output connected to high-side driver circuit 536, and a second output connected to an input of a logic/timing circuit 532, which has a second input connected to an output of a comparator 530 and an output connected to an input of low-side driver circuit 538. Low-side driver circuit 538 includes an output connected to pad 522. In an alternative embodiment, diode 506 may be moved off chip between voltage source ($V_{CC}$) 508 and pad 504. In such an alternative embodiment, a bootstrap capacitor (not shown) could be coupled between pad 504 and pad 524, which capacitor could be used to provide an operating power to level shift circuit 534 and high-side driver circuit 536 enabling transistor 510 to conduct current when a voltage on pad 524 is high.

Circuit 502 further includes a transistor 528 having a drain connected to pad 524, a gate connected to pad 522, and a source connected to a first input of comparator 530, which has a second input connected to a reference voltage ($V_B$) and an output connected to the input of logic/timing circuit 532. Circuit 502 further includes a current source 550 having a first terminal connected to pad 526 and a second terminal connected to a first terminal of a switch 552, which has a second terminal connected to the first input of comparator 530 and a control terminal connected to pad 522.

Level shift circuit 534 sends the high-side control signal from logic/timing circuit 532 to high-side drive circuit 536 to control the on-time of high-side transistor 510. Transistor 528, switch 552, and current source 550 cooperate to provide a level shift function and/or to discharge the capacitor 518 before performing a soft-start operation. Further, when low-side driver circuit 538 applies a positive low-side drive signal 404 to pad 522, transistor 528 turns on and switch 552 is closed, connecting the voltage on the drain of transistor 528 to the first input of comparator 530 and current source 550. Comparator 530 compares the voltage to reference voltage ($V_B$) and produces an output state corresponding to the voltage on pad 524 and reference voltage ($V_B$).

In an example, when the low-side drive signal 404 is at a logic high level, high-side drive signal 402 is at a logic low level, turning off current flow through transistor 510 and allowing current flow through transistor 512. The logic high level of low-side drive signal 404 turns on transistor 528, providing a pad voltage from pad 524 to the first input of comparator 530. Comparator 530 compares the pad voltage at the first input to reference voltage ($V_B$) and provides an output signal to logic/timing circuit 532 that corresponds to the difference between the pad voltage and the reference voltage ($V_B$). Logic/timing circuit 532 provides a first on-time signal to low-side drive circuit 538, which produces low-side drive signal 404 having a pulse duration determined by the first on-time signal. Because the resistances of the transistors 510 and 512 when conducting current are known, the current in inductor 614 can be determined by the voltage at 524 when the low side drive 512 is on. Also, the peak current for the high-side transistor 510 can be inferred from the voltage on the drain of the low-side transistor 512 at the time the low-side transistor 512 is first turned on, assuming little or no delay in transition. Logic/timing circuit 532 can adjust the duration of the low-side drive signal 404 to control the on-time of transistor 512, allowing the voltage at pad 524 representative of low side current to cross a threshold level (such as a zero current threshold) before turning off transistor 512 and activating transistor 510. Similarly, logic/timing circuit 532 can be configured to control the on-time of high-side transistor 510, allowing the current ($I_{ind}$) 408 in inductor 614 to increase from a first current level (such as a negative peak current level) to a second current level (such as a zero current threshold).

In this embodiment, the zero current level in the high-side transistor 510 can not be detected directly; however, it can be indirectly determined when the low-side transistor 512 begins to conduct current. When the low-side transistor 512 is turned on, the last current in the high-side transistor 510 becomes available. If the current from the high-side transistor 510 has not crossed over the zero current level, the next on-time of the high-side transistor 510 needs to be longer to allow zero current to be reached. Thus, on a cycle-by-cycle basis, the high-side on-time can be extended to allow the current at pad 524 to reach a threshold current level, such as the zero crossing level. Also or alternatively, the low-side on-time can be shortened on a cycle-by-cycle basis until the high-side on-time is sufficient for the current to reach the threshold current level.

It should be understood that the peak currents for the high-side transistor 510 and the low-side transistor 512 can be detected. With this information, instead of slowly ramping the switching frequency of the high-side and low-side drive signals 402 and 404, circuit 502 can directly and independently adjust the on-times of the high-side transistor 510 and the low-side transistor 512 to produce a desired peak inductor current ($I_{ind}$) 408. In this instance, circuit 502 can be used for soft-start functionality and also for current mode control of the resonant controller or for an overload current limit circuit. An example of a timing diagram of high-side drive signal 402, low-side drive signal 404, and inductor current 408 is depicted in FIG. 6 for a resonant controller configured to use peak current thresholds and a zero crossing threshold to control on-times of the high-side and low-side transistors 510 and 512.

Figure 6:
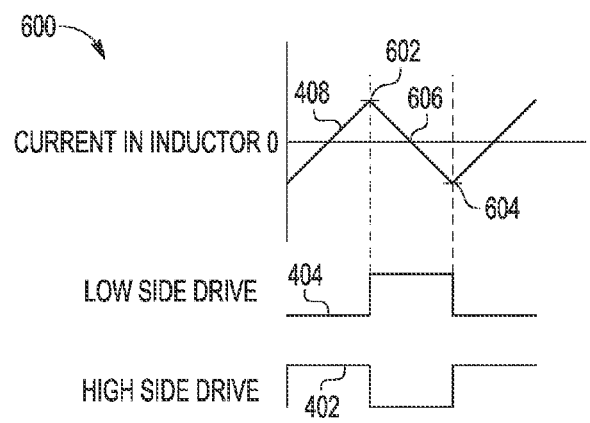
FIG. 6 is a timing diagram of the high and low-side drive signals and the inductor current showing timing of the variable on-times of the high and low drive signals in response to timing of zero current events.

FIG. 6 is a timing diagram of the high-side drive signal 402, low-side drive signal 404, and inductor current 408. In the illustrated example, high-side drive signal 402 is initially at a logic high level. While high-side drive signal 402 is at a logic high level and the low-side drive signal 404 is at a logic low level, inductor current 408 increases to a peak positive inductor current level at 602. When the peak current level 602 is reached, high-side drive signal 402 is turned off, and low-side drive signal 404 is turned on. When the low-side drive signal 404 is at a logic high level and the high-side drive signal 402 is at a logic low level, inductor current 408 decreases from the peak inductor current level at 602 toward a peak negative inductor current level at 704, crossing the zero current level at 606.

While the zero current (zero crossing) level 606 is relatively easy to find, it should be appreciated that different current thresholds may be used for high-side detection and for low-side detection. For example, the zero current threshold may be below the zero crossing level at 606 for the low-side current detect function (i.e., when the inductor current 408 is decreasing from a positive peak current level to a negative peak current level), and the zero current threshold may be above the zero crossing level for the high-side current detect function (i.e., when the inductor current ($I_{ind}$) 408 is increasing from a negative peak current level to a positive peak current level). In general, using only low-side detection, the peaks 602 and 604 can only be measured when the low-side is on. Circuit 502 has no problem detecting the zero current threshold (zero crossing) 606 for the low-side on signal, and the zero crossing from the high-side can be inferred.

Depending on the resonant capacitor voltage, it can take more time for the inductor current 408 to increase and cross the zero current level than for the current to decrease from the peak positive current level at 602 to reach or cross the zero current level at 606. In some instances, circuit 502 controls the high-side driver circuit 536 and the low-side driver circuit 538 to ensure that the inductor current 408 crosses the zero current threshold before the high-side driver circuit 536 applies a high-side drive signal 402 having a logic high level. While the inductor current 408 is depicted crossing a zero current level, it should be appreciated that, in some instances, a threshold other than zero amperes could be used. In a particular example, logic/timing circuit 532 controls the timing of high-side driver circuit 536 and low-side driver circuit 538 based on the level of the inductor current 408 as compared to a non-zero current threshold. In one instance, circuit 502 compares the absolute value of the voltage at 703 (in FIG. 7) to a threshold voltage that represents a current 408 in the inductor (such as a 50 mA threshold), and controls the timing of one or both of the high-side drive signal 402 and the low-side drive signal 404 to ensure that the inductor current 408 reaches the threshold before applying the next logic high pulse of the high-side drive signal 402.

Figure 7:
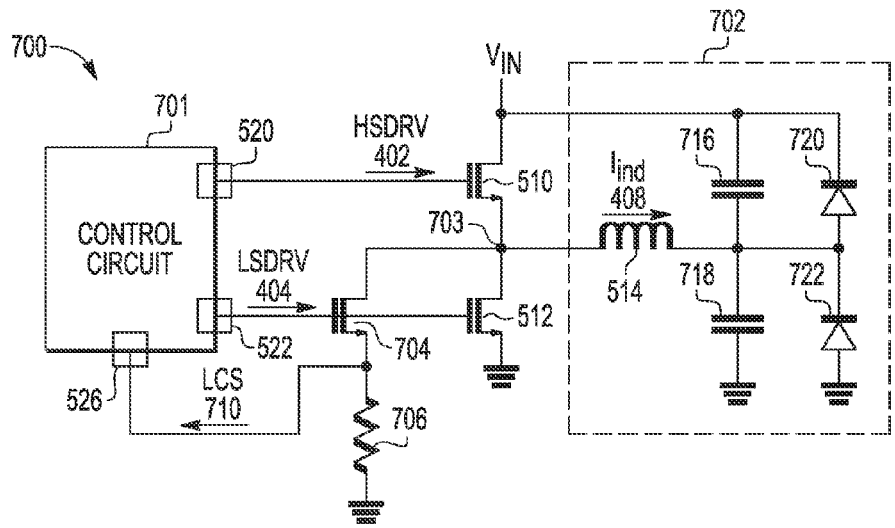
FIG. 7 is a partial block diagram and a partial schematic diagram of a system including a control circuit configured to drive a switching bridge coupled to an inductive/capacitive load.

FIG. 7 is a partial block diagram and a partial schematic diagram of a system 700 including a circuit 701 configured to drive a switching bridge coupled to an inductive/capacitive load (resonant circuit) 702. Circuit 701 is similar to circuit 502 in FIG. 5, except that it includes additional logic circuitry (depicted in FIGS. 9-13) to provide independent control of the high-side and low-side drive signals 402 and 404, respectively. Circuit 701 includes pads 520, 522, and 526 as shown in FIG. 5; however, as compared to circuit 502 in FIG. 5, pad 524 is omitted.

System 700 further includes transistor 510 including a drain connected to an input source (Vin) and to a resonant circuit 702, a gate connected to pad 520, and a source connected to a node 703. System 700 further includes transistor 512 having a drain connected to node 703, a gate connected to pad 522, and a source connected to ground. System 700 further includes a transistor 704 including a drain connected to node 703, a gate connected to pad 522, and a source connected to pad 526. System 700 also includes a sense resistor 706 having a first terminal connected to the source of transistor 704 and a second terminal connected to ground. In an alternative embodiment, transistor 704 and resistor 706 may be incorporated within circuit 701.

Resonant circuit 702 includes inductor 514 having a first terminal connected to node 703 and a second terminal. Resonant circuit 702 further includes a capacitor 716 having a first electrode connected to the drain of transistor 510 and a second electrode connected to the second terminal of inductor 514. Resonant circuit 702 also includes a capacitor 718 including a first electrode connected to the second terminal of inductor 514 and a second electrode connected to ground. Load circuit 702 further includes a diode 720 having an anode connected to the second terminal of inductor 514 and a cathode connected to the drain of transistor 510. Load circuit 702 also includes a diode 722 having an anode connected to ground and a cathode connected to the second terminal of inductor 514. Diodes 720 and 722 perform a current limit function. In some embodiments, inductor 408 could be replaced by an inductor and a transformer.

In operation, circuit 701 activates transistor 512 and transistor 704 by applying the low-side drive signal 404 to their gates, driving the inductor current 408 and providing a low-side current sense (LCS) signal 710 in the form of a voltage representing the current in 408 on resistor 706 to pad 526. Circuit 701 controls the timing of high-side drive signal 402 and low-side drive signal 404 based on the LCS signal 710 to control inductor current 408 such that the inductor current 408 crosses a pre-determined current threshold (such as a zero current threshold or another current threshold) and it also keeps the current in inductor 408 between maximum and minimum current thresholds. In a particular example, circuit 701 provides current limit control for resonant circuit 702 coupled to the output node 703.

Circuit 701 includes logic circuitry configured to determine on-times of high-side and low-side transistors 510 and 512 based on LCS signal 710. Examples of logic circuitry configured to produce signals used to determine the on-times are described below with respect to FIGS. 8-13.

Figure 8:
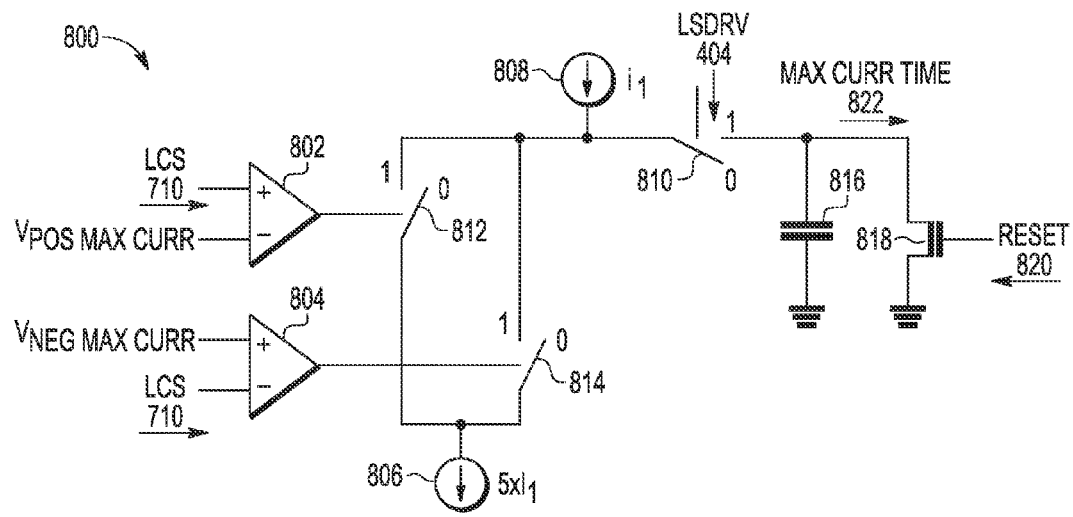
FIG. 8 is a diagram of a logic circuit configured to generate a maximum current time signal for use in controlling on-times of the high and low-side drive signals.

FIG. 8 is a diagram of a logic circuit 800 configured to generate a maximum current time signal 822 for use in controlling on-times of the high and low-side drive signals. Logic circuit 800 may be included within circuit 701 depicted in FIG. 7. Logic circuit 800 includes a comparator 802 having a positive input connected to pad 526 (in FIG. 7) for receiving LCS signal 710, a negative input for receiving a positive voltage signal proportional to a maximum current (VPos Max Curr) level, and an output connected to a switch 812. Switch 812 includes a first terminal connected to a current source 808 and a second terminal connected to a current source 806, which may be proportional to a current from current source 808. In the illustrated example, current source 806 sinks a current that is approximately five times greater than the current supplied by current source 808. In other examples, the relationship of the current of current source 806 to the current of current source 808 may vary.

Logic circuit 800 further includes a comparator 804 having a positive input for receiving a negative voltage signal proportional to a maximum negative current (VNeg Max Curr) level, a negative input connected to pad 526 (in FIG. 7) for receiving LCS signal 710, and an output connected to a switch 814. Switch 814 includes a first terminal connected to current source 808 and a second terminal connected to current source 806. Logic circuit 800 further includes a switch 810 connected to pad 522 (in FIG. 7) for receiving the low-side drive signal (LSDRV) 404, a terminal connected to current source 808 and a second terminal for providing a maximum current time signal (Max Curr. Time) 822. Logic circuit 800 further includes a capacitor 816 having a first electrode connected to the second terminal of switch 810 and a second electrode connected to ground. Further, logic circuit 800 includes a transistor 818 having a first current electrode connected to the second terminal of switch 810, a control electrode for receiving a reset signal 820, and a second current electrode connected to ground.

In operation, when a reset signal 820 is applied to the gate of transistor 818, any voltage stored by capacitor 816 can be discharged to ground. When low-side drive signal 404 is a logic low level, switch 810 is open and current source 808 is not connected to capacitor 816 and transistor 818. When low-side drive signal 404 is at a logic-high level, switch 810 connects current source 808 to capacitor 816 and the current electrode of transistor 818. Comparator 802 compares LCS signal 710 to positive voltage maximum current ($V_{POS\ MAX\ CURR}$) signal and produces an output signal that controls switch 812. When LCS signal 710 exceeds the positive voltage maximum current threshold, switch 812 is closed, current from sources 806 and 808 sum to produce a net current of 4 I to charge capacitor 816, altering the maximum current time signal 822. Similarly, when the LCS signal 710 falls below the negative voltage maximum current ($V_{NEG\ MAX\ CURR}$) signal, comparator 804 produces a signal to close switch 814 to alter the maximum current time signal 822. Thus, the time necessary for the high-side transistor 510 and the low-side transistor 512 to drive the inductor current 408 to their respective maximum current peaks is represented by Vmaxcurrtime and are determined from the LCS signal 710 and the positive and negative thresholds.

In a particular embodiment, the maximum current time signal 822 is a maximum peak current timer that is common to the high-side transistor 510 and the low-side transistor 512. The system 500, for example, may include multiple timers and produce multiple timing signals, such as the maximum current time signal 822, a low-side zero or minimum current timer corresponding to the time it takes for the low-side transistor 512 to reach the zero current level, and a high-side current timer corresponding to the time it takes for the high-side transistor 510 to reach the zero or minimum current level. For the low-side transistor 512, the on-time will be the shortest of the normal on-time timer and the maximum peak current timer, unless the low-side zero or minimum current timer is longer, in which the case the low-side zero or minimum current timer controls the low-side transistor 512. For the high-side transistor, the on-time is the shortest of the normal on-time timer and the maximum peak current timer (controlled by maximum current time signal 8222), unless the high-side (minimum or zero) current timer is longer, in which case the high-side (minimum or zero) current timer controls the high-side transistor 510. In this way, system 500 substantially reduces high peak currents during start up and reduces or eliminates high power dissipation in the transistors 510 and 512 because the transistors 510 and 512 are fully switched.

Figure 9:
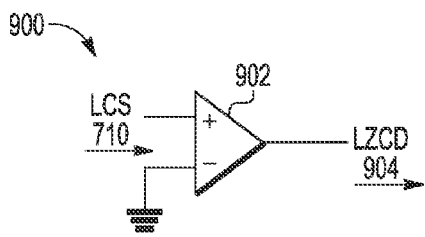
FIG. 9 is a diagram of a logic circuit configured to generate a low-side zero current signal for use in controlling on-times of the high and low-side drive signals.

FIG. 9 is a diagram of a logic circuit 900 configured to generate a low-side zero current (LZCD) signal 904 for use in controlling on-times of the high and low-side drive signals. Logic circuit 900 includes a comparator 902 configured as a comparator. Comparator 902 includes a positive input for receiving the LCS signal 710 and a negative input connected to a bias signal source, such as ground. In this instance, logic circuit 900 generates the LZCD signal 904 that switches state when the LCS signal 710 crosses approximately zero volts. In an alternative embodiment, the negative input of comparator 902 may be connected to a pre-determined signal source defining a threshold other than zero. In a particular example, the threshold may be defined by a threshold voltage that represents a current of 50 mA or some other current.

Figure 10:
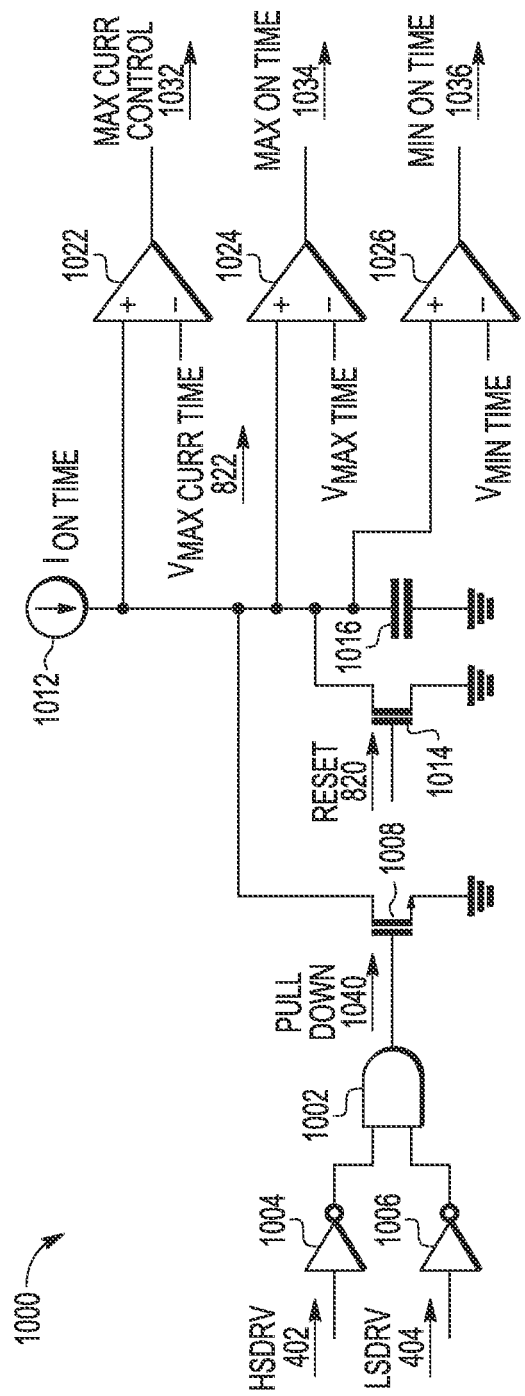
FIG. 10 is a diagram of an embodiment of a logic circuit configured to generate a maximum current control signal, a maximum on-time signal and a minimum on-time signal.

FIG. 10 is a diagram of a logic circuit 1000 configured to generate a maximum current control signal 1032, a maximum on-time signal 1034, and a minimum on-time signal 1036. Logic circuit 1000 includes an inverter 1004 including an input for receiving the high-side drive signal 402 and an output connected to a first input of an AND gate 1002. Logic circuit 1000 further includes an inverter 1006 having an input for receiving the low-side drive signal 404 and an output connected to a second input of AND gate 1002, which in turn includes an output for carrying a pull down signal 1040.

Logic circuit 1000 further includes a transistor 1008 including a drain connected to an on-time current source 1012, a gate connected to the output of AND gate 1002 for receiving pull down signal 1040, and a source connected to ground. Logic circuit 1000 also includes a transistor 1014 including a first current electrode connected to on-time current source 1012, a control electrode for receiving a reset signal 820, and a source connected to ground. Logic circuit 1000 also includes a capacitor 1016 having a first electrode connected to on-time current source 1012 and a second electrode connected to ground.

Logic circuit 1000 also includes a plurality of comparators. In particular, logic circuit 1000 includes comparator 1022 having a positive input connected to on-time current source 1012, a negative input for receiving a maximum current time signal 822, and an output for providing a maximum current control signal 1032. Logic circuit 1000 includes comparator 1024 having a positive input connected to on-time current source 1012, a negative input for receiving a maximum time signal, and an output for providing a maximum on-time signal 1034. Logic circuit 1000 includes comparator 1026 having a positive input connected to on-time current source 1012, a negative input for receiving a minimum time signal, and an output for providing a minimum on-time signal 1036.

In operation, inverters 1004 and 1006 invert high-side drive signal 402 and low-side drive signal 404, respectively, and provide the inverted outputs to AND gate 1002. When both the high-side drive signal 402 and the low-side drive signal 404 are at a logic-low level, AND gate 1002 produces a logic high pull down signal 1040 that turns on transistor 1008, and discharges the voltage on capacitor 1016. Comparator 1022 compares a voltage across capacitor 1016 to a maximum current time voltage 822 to produce a maximum current control signal 1032 corresponding to a fixed maximum on time. Further, comparator 1024 compares the voltage across capacitor 1016 to a maximum time signal voltage and produces a maximum on-time signal 1034 corresponding to a time it takes for either the high side or the low side to reach an inductor current peak. Comparator 1026 compares voltage across capacitor 1016 to a minimum on-time voltage to produce a minimum on-time signal 1036. Transistor 1014 provides a reset function by providing a current path to ground in response to reset signal 820.

In the illustrated embodiment of FIGS. 7-10, logic circuit 1000 produces output signals that can be used to control various logic elements to independently adjust the on-times of the high-side drive signal 402 and the low-side drive signal 404 in order to control the on-times of their respective transistors 510 and 512 to produce a desired output voltage while controlling the inductor current ($I_{ind}$) 408.

Figure 11:
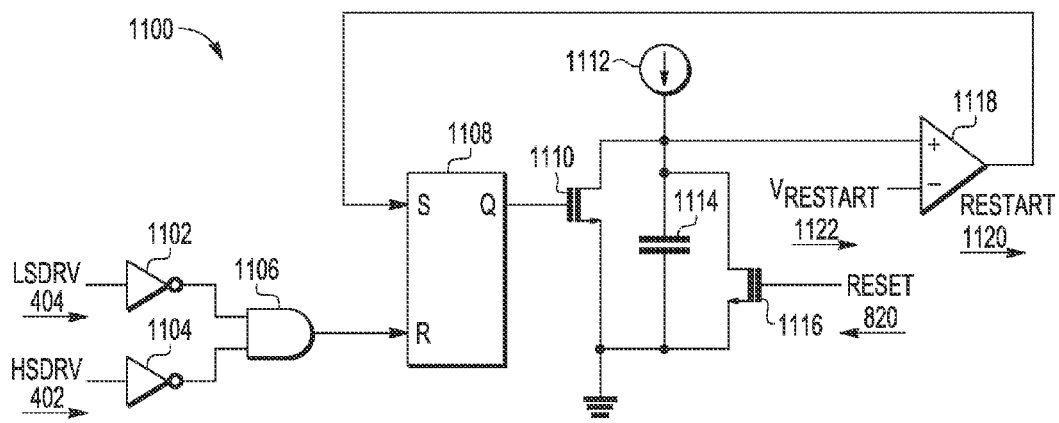
FIG. 11 is a partial block diagram and partial logic diagram of an embodiment of a circuit configured to generate a restart signal for both high-side and low-side circuitry in response to the high-side output signal and the low-side output signal.

FIG. 11 is a diagram of a logic circuit 1100 configured to generate a restart signal 1120 in response to the high-side drive signal 402, and the low-side drive signal 404. Logic circuit 1100 includes an inverter 1102 having an input to receive the low-side drive signal 404 and an output connected to a first input of an AND gate 1106. Logic circuit 1100 further includes an inverter 1104 including an input to receive the high-side drive signal 402 and an output connected to a second input of AND gate 1106, which has an output connected to an R-input of a latch 1108. Latch 1108 includes an S-input for receiving restart signal 1120 and an output for driving a gate of a transistor 1110. When low-side drive signal 404 and high side drive signal 402 are both zero for a period of time sufficient to discharge capacitor 1016 in FIG. 10, AND gate 1106 produces a logic high signal, resetting latch 1108 and producing a logic high output signal on the Q-output. Latch 1108 is configured such that the reset signal at the R-input is dominant, causing the output of latch 1108 to remain at a logic-low level as long as the R-input is at a logic high level.

Transistor 1110 includes a drain connected to a current source 1112 and a source connected to ground. Logic circuit 1100 also includes a capacitor 1114 having a first current electrode connected to current source 1112 and a second current electrode connected to ground. Logic circuit 1100 further includes a transistor 1116 including a drain connected to current source 1112, a source connected to ground, and a gate for receiving reset signal 820. Logic circuit 1100 also includes a comparator 1118 implemented as a comparator including a first input connected to current source 1112, a second input for receiving a restart voltage signal ($V_{RESTART}$) 1122, and an output for providing a restart signal 1120.

Figure 13:
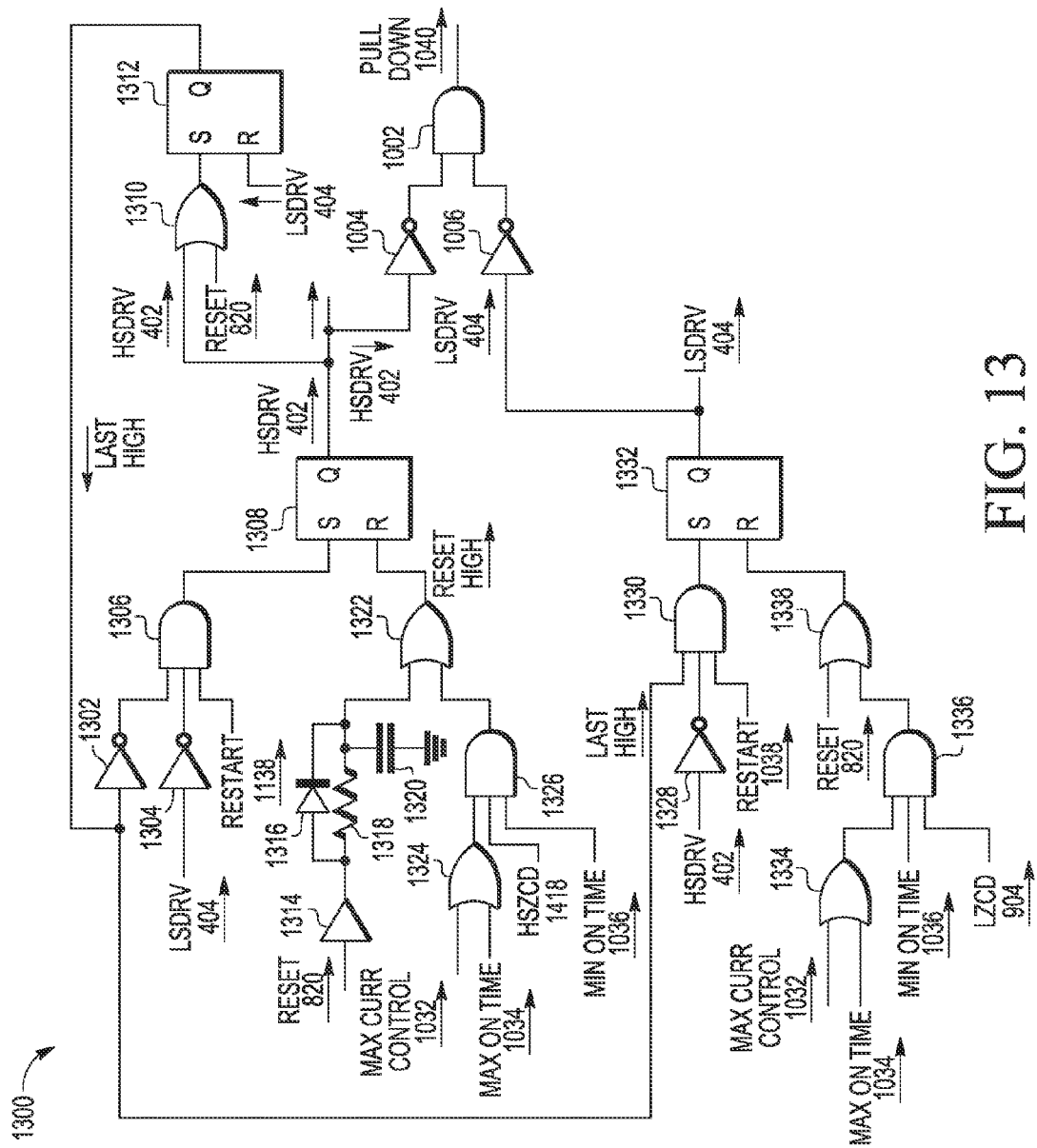
FIG. 13 is a diagram of an embodiment of a logic circuit configured to implement the soft-start functionality and to generate the high-side output signal and the low-side output signal of FIGS. 7-12.

In operation, circuit 1100 creates a fixed dead time between drive pulses. Current source 1112 delivers a current that charges capacitor 1114, while transistors 1110 and 1116 are turned off. The charge on capacitor 1114 is compared to the restart voltage signal ($V_{RESTART}$) 1122 using comparator 1118, which produces an output representing the restart signal 1120 that turns on the next drive pulse as shown in FIG. 13. When the reset signal 820 is at a logic high level, the charge on capacitor 1114 is discharged through transistor 1116 to ground, resetting the voltage level on capacitor 1114.

When the low-side drive signal 404 and the high-side drive signal 402 are at logic low levels, AND gate 1106 produces a logic high signal that resets the gate of transistor 1110 to ground, turning off current flow through transistor 1110 and allowing current source 1112 to charge capacitor 1114. When the charge on capacitor 1114 exceeds the $V_{RESTART}$ signal 1122, comparator 1118 produces restart signal 1120, which is applied to the S-input of latch 1108. However, as long as the reset signal at the R-input of latch 1108 is at a logic high level, the Q-output provides a logic high output signal.

Latch 1108 provides a logic low output when the output of AND gate 1106 is at a logic high level and provides a logic high output when the output of AND gate 1106 is at a logic low level and after S has gone to a high state, provided the reset signal at the R-input of latch 1108 is at a logic-low level. In the illustrated example, the level of the current supplied by current source 1112 and the size of the capacitor 1114 determine the timing of the restart signal 1120, producing a fixed off-time between the high-side and low-side drives. An example of a circuit configured to infer the high-side signal from the LCS signal 710 is described below with respect to FIG. 12.

Figure 12:
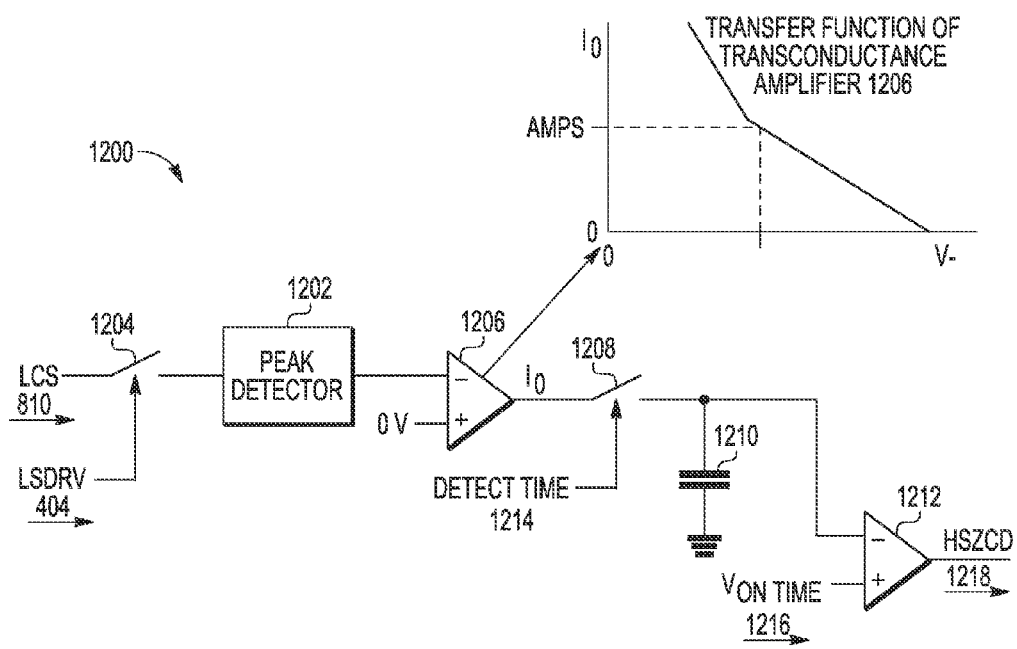
FIG. 12 is a partial block diagram and partial logic diagram of an embodiment of a logic circuit configured to produce a high-side zero crossing detection signal when the high-side zero crossing cannot be measured directly.

FIG. 12 is a partial block diagram and partial logic diagram of an embodiment of a logic circuit 1200 configured to produce a high-side zero crossing detection signal 1218 in combination with a transconductance amplifier transfer function. Logic circuit 1200 includes a peak detector 1202 including an input configured to receive low-side current sense signal 810 via a switch 1204 that is responsive to a low-side drive signal 404. Peak detector 1202 further includes an output connected to a negative input of transconductance amplifier 1206, which includes a positive input connected to a threshold voltage, such as a zero volt reference signal. Transconductance amplifier 1206 includes an output connected to a first input of a switch 1208, which includes a control terminal for receiving a detect time signal 1214 and a second terminal connected to a first current electrode of a capacitor 1210. Capacitor 1210 includes a second current electrode connected to ground. The first current electrode of capacitor 1210 is also connected to a negative input of a comparator 1212, which includes a positive input for receiving a high-side voltage on-time signal 1216 and an output for carrying a high-side zero crossing detect signal 1218.

In operation, when the low-side drive signal 404 is at a logic high level, switch 1204 provides the LCS signal 710 to the input of peak detector 1202. Peak detector 1202 generates an output signal equal to the peak voltage of LCS for that cycle. The output signal is provided to the negative input transconductance amplifier 1206. Amplifier 1206 produces a current output signal proportional to the difference between the threshold (in this instance a zero voltage threshold) and the output of the peak detector (Note: this conversion can be non linear as shown in FIG. 12). A detect time signal 1214 controls switch 1208 to connect the output of amplifier 1206 to the negative input of comparator 1212 and to capacitor 1210. The charge across capacitor 1210 is compared to the high-side voltage on-time signal 1216, and comparator 1212 produces a high-side zero crossing detection signal 1218. The HSZCD signal adjusts over a few cycles with transition to a high state approximately when zero current will be reached on the high side driver.

In general, logic circuitry 1100 and 1200 depicted in FIGS. 8, 10, and 12 can be included within circuit 701 depicted in FIG. 7 to control the on-time of high-side transistor 510. Further, circuit 701 (or circuit 502 in FIG. 5) can include logic circuits 800, 900, and 1000 depicted in FIGS. 8-10 to control the on-time of low-side transistor 512. While in the above-embodiments, circuitry has been connected to pad 524 or to an external resistor (706 in FIG. 7) to find the zero current crossing, it is possible to use an additional winding on the transformer to find zero current for both high-side and low-side zero crossing (or threshold crossing) conditions.

FIG. 13 is a diagram of a circuit 1300 configured to generate he high-side drive signal 402 and the low-side drive signal 404 of FIGS. 7-12. Circuit 1300 generates the high-side drive signal 402 and low-side drive signal 404. Logic circuit 1300 produces a last high signal that tracks which drive pulse (high-side or low-side) should be turned on next. Logic circuit 1300 includes an inverter 1302 including an input for receiving a last high signal and an output connected to a first input of an AND gate 1306. Logic circuit 1300 includes an inverter 1304 including an input for receiving a low-side drive signal 404 and an output connected to a second input of AND gate 1306. AND gate 1306 includes a third input for receiving restart control signal 1038 and an output connected to an S-input of a latch circuit 1308, which includes an R-input, and an output for providing high-side drive signal 402. When last high signal and low-side drive signal 404 are both zero for a period of time and restart signal 1138 is at a logic high level, AND gate 1306 produces a logic high signal at the set input of latch 1308. However, the signal at the R-input of latch 1308 controls the signal on the Q-output. When the reset signal 820 is applied or when the HSZCD 1418, the minimum on time signal 1036, and one of the maximum current control signal 1032 and the maximum on time signal 1034 are at logic high levels, OR gate 1322 applies a logic high signal to the R-input to reset latch 1308. Logic circuit 1300 further includes an OR gate 1310 including a first input connected to the output of latch circuit 1308, a second input for receiving reset signal 820, and an output connected to an S-input of latch 1312, which has an R-input for receiving low-side drive signal 404, and an output for providing the last high signal. When the high-side drive signal 402 or the reset signal 820 are at logic high levels, OR gate 1310 applies a logic high signal to the S-input of latch 1312. However, the signal at the R-input of latch 1312 is dominant. When the low-side drive signal 404 applied to the R-input of latch 1312 is at a logic high level, latch 1312 resets and provides a logic high output signal. Latch 1312 continues to provide the logic high output signal as long as the signal on the R-input is at a logic high level.

Logic circuit 1300 includes a buffer 1314 including an input for receiving reset signal 820 and an output connected to an anode of a diode 1316 and to a first terminal of a resistor 1318. Resistor 1318 includes a second terminal connected to a cathode of diode 1316 and to a first input of an OR gate 1322. OR gate 1322 includes a second input connected to an output of an AND gate 1326 and an output connected to the R-input of latch circuit 1308. AND gate 1326 includes a first input connected to an output of an OR gate 1324, which has a first input for receiving maximum current control signal 1032 and a second input for receiving maximum on-time signal 1034. AND gate 1326 includes a second input for receiving minimum on-time signal 1036 and a third input for receiving a high-side zero crossing detect signal 1340. It should be appreciated that the high-side zero crossing detect signal 1218 can represent a non-zero threshold signal.

Logic circuit 1300 further includes an inverter 1328 including an input for receiving the high-side drive signal 402 and an output connected to an input of an AND gate 1330. AND gate 1330 includes a second input for receiving the last high signal and a third input for receiving restart control signal 1038. AND gate 1330 also includes an output connected to an S-input of a latch circuit 1332, which includes an R-input and an output for providing the low-side drive signal 404. When the last high signal and restart signal 308 are at logic high levels and high side drive signal 402 as at a logic low level zero for a period of time, AND gate 1330 produces a logic high signal at the S-input of latch 1332. The signal at the R-input of latch 1332 controls the output. When the reset signal 820 is applied or LZCD signal 904 and the minimum on time signal 1036 and one of the maximum current control signal 1032 and the maximum on time signal 1034 are at logic high levels, OR gate 1338 applies a logic high signal to the R-input, resetting the latch 1332 and causing latch 1332 to provide a logic high signal on its Q-output.

Logic circuit 1300 also includes an OR gate 1334 including a first input for receiving the maximum current control signal 1032, a second input for receiving the maximum on-time signal 1034, and an output connected to an input of AND gate 1336. AND gate 1336 includes a second input for receiving the minimum on-time signal 1036, a third input for receiving a low-side zero current detect (LZCD) signal 904, and an output connected to a second input of OR gate 1338. OR gate 1338 includes a second input for receiving reset signal 820 and an output connected to the R-input of latch 1332.

In operation, latch 1312 produces a last high output signal, which is fed back to AND gate 1306 and 1330. The last high output signal holds (during the dead time between drive pulses) the state of the last drive signal (high-side or low-side) that was high. Inverters 1304 and 1302 invert low-side output signal 714 and the last high signal, respectively, and provide the inverted signals to first and second inputs of AND gate 1306. AND gate also receives restart control signal 1038 and provides a logic-high output signal to the S-input of latch circuit 1308 when the inverted signals and the restart control signal 1038 are all at a logic-high level.

OR gate 1324 produces a logic-high output when either of the maximum current control signal 1032 or the maximum on-time signal 1034 are at a logic-high level, and provides the logic-high output to AND gate 1326. AND gate 1326 includes a second input for receiving the minimum on-time signal 1036 and produces a logic high output signal when both the minimum on-time signal 1036 and high side zero current detect signal 1418 and one of the maximum current control signal 1032 or the maximum on-time signal 1034 are at logic high levels. AND gate 1326 provides the resulting signal to OR gate 1322. Buffer 1314 receives reset signal 820 and produces a delayed version of reset signal 820. The reset signal 820 is provided to OR gate 1322 through resistor 1318 and diode 1316 and is used to charge filter capacitor 1320. The filter capacitor 1320 delays the removal of the reset high signal as applied to the high side drive latch 1308, ensuring that the low-side drive starts first. OR gate 1322 produces a logic high level to reset latch circuit 1308 whenever either the delayed version of reset signal 820 or the output of AND gate 1326 are at a logic high level.

Latch circuit 1308 is set by the output of AND gate 1306 and reset by the output of OR gate 1322, which produces a logic high signal when the reset signal 820 is high or when AND gate 1326 produces a logic high signal. As with the other latches described above, the signal at the R-input of latch circuit 1308 controls the output signal on the Q-output. AND gate 1326 produces a logic high signal in response to HSZCD signal 1418, minimum on-time signal 1036, and the output of OR gate 1324, which is responsive to the maximum current control signal 1032 and the maximum on-time signal 1034. The high-side drive signal 402 is provided to OR gate 1310 and to inverter 1004. In an embodiment, latch circuit 1312 produces an output that is high when the low side drive should come on next, and low when the high-side drive should come on next. OR gate 1310 provides either the high-side drive signal 402 or the reset signal 820 to the S-input of latch 1312. Inverter 1004 inverts the high-side drive signal 402 and provides the inverted version to AND gate 1002, which takes an inverted version of the low-side drive signal 404 from inverter 1006 and produces a pull down signal 1040 that is at a logic high-level whenever the high-side drive signal 402 and the low-side drive signal 404 are at logic low levels.

When the high-side drive signal 402 is on, the signal at the S-input of latch 1332 is at a logic low level. When the low-side drive signal 404 is on, the low-side zero current detection circuitry is active. When the low-side zero current is detected, LZCD 904 is at a logic high level. If minimum on-time signal 1036 and one of the maximum on-time signal 1034 and the maximum current control signal 1032 are at logic high levels, AND gate 1236 produces a logic high signal, causing OR gate 1338 to produce a logic high signal to reset latch 1332 and causing latch 1332 to output a logic high signal.

In operation, each drive signal (high-side drive signal 402 or low-side drive signal 404) is turned off when the zero current detect (high-side zero current detect 1218 or low side zero current detect 904), the minimum on time signal 1036, and the maximum on time signal 1034 or the maximum current control signal 1032 (maximum current on time signal) time have occurred. Thus, the logic reduces the on time of the corresponding drive signal to limit the peak current at the output or increases the on time of the corresponding drive signal to ensure the inductor current 408 reaches a pre-determined current threshold (such as a zero current threshold as an example).

If the voltage (Vcap) 406 on the resonant capacitor 518 starts low, then the low side zero current detection signal 904 for the low-side driver is used. This low-side zero current level can be measured directly when the low-side driver (transistor 512 in FIG. 5) is on. In this embodiment, when the resonant capacitor voltage (Vcap) 406 starts high, the zero current for the high-side has to be approximated from the information on the current sense (i.e., transistor 528, comparator 530, and current source 550) when the low-side driver turns on. This means that the zero current information for the high-side cannot be applied until the next high-side drive pulse, creating a cycle by cycle delay.

Figure 14:
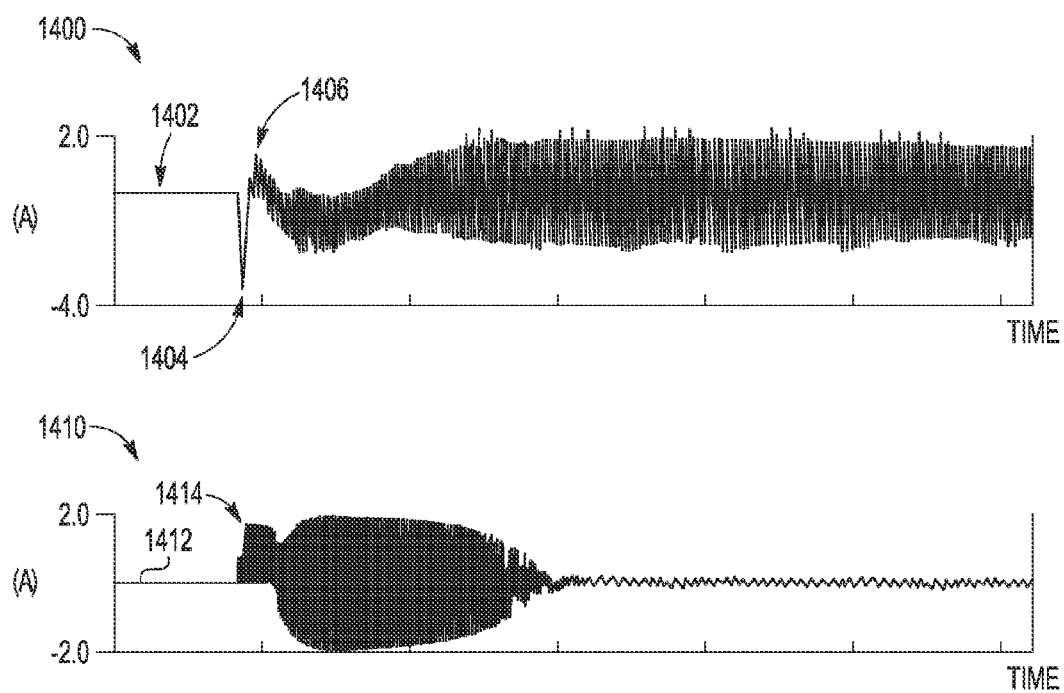
FIG. 14 depicts two graphs of representative examples of output currents versus time for a circuit, such as the circuit of FIG. 1, driven using high and low-side drive signals that have independently variable on-times to provide a soft-start current ramp.

FIG. 14 depicts two graphs 1400 and 1410 of representative examples of the inductor current ($I_{ind}$) 408 in amperes versus time for a circuit, such as the circuit of FIG. 5, driven using high and low-side drive signals that have independently variable on-times to provide the soft-start functionality. In graph 1400, when the resonant capacitor 518 is initially charged to voltage above the normal operation voltage on the resonant capacitor. In this example, the capacitor voltage (Vcap) 406 starts at a relatively high (non-discharged) level. At 1402, inductor current 408 is at approximately a zero current level. Prior to 1404, the startup process is initiated, producing a current spike at 1404 due to the cycle-by-cycle zero crossing detection of the high-side zero crossing based on the low-side transistor (i.e., transistor 104 in FIG. 1), which introduces a delay to the current limit. In particular, as previously discussed, when the resonant capacitor voltage (Vcap) 406 starts high, then the zero current for the high-side has to be approximated from the information on the current sense when the low side is on. This means that the zero current information for the high-side driver 610 cannot be applied until the next high-side drive pulse of high-side drive signal 402, creating a cycle-by-cycle delay that produces an initial current spike. The resulting current spike has an absolute value, peak current level of less than a 3.8 Amps, which is significantly less than the peak current described above with respect to FIG. 3 for the equal on-time resonant controller. At the next high-side pulse of high-side drive signal 402, circuit 502 controls the high-side drive signal 402 and the low-side drive signal 404 to control at least one of the on-time of the high-side transistor 510 and the on-time of the low-side transistor 512, reducing the peak current. Inductor current 408 then increases to a current level of about 1.7 Amps (at 506) before settling into a relatively stable oscillating (switching) current.

Referring to graph 1410, at 1412, inductor current ($I_{ind}$) 408 is at approximately a zero current level. Prior to 1414, the startup process is initiated. However, because the resonant capacitor 108 is discharged in this example, the low-side zero detect is used, which has no delay, and therefore there is no current spike. Instead, the current increases quickly to approximately a current limit and then stabilizes within a current range of approximately plus or minus 2 Amperes. Thus, controlling the high-side drive signal 402 and the low-side drive signal 404 to have different on-times reduces the amplitude of the current spikes and thereby reducing stresses on associated circuitry.

In conjunction with the embodiments described above with respect to FIGS. 1 and 4-14, a resonant controller circuit provides soft-start functionality through independent control of low-side driver and high-side driver on-times. In one embodiment, a circuit includes a resonant controller circuit configured to independently control the on-times of the high-side driver and the low-side driver such that the inductor current crosses a current threshold before switching on/off the transistors. In one particular example, the circuit includes two timers (a zero crossing detection-timer for the low-side and zero crossing estimator for the high-side) that control the on-times to yield a net charging current to the resonant capacitor, such as capacitor 518, which net charging current does not build up over time. If the initial charge stored by the resonant capacitor voltage was guaranteed to start at either a high level or a low-level, then one of the timers could be omitted. In some instances, the circuit further includes an over-current timer or common on-time ramp.

In a particular embodiment, the circuit includes a current detection FET in the half-bridge of the transistor driver circuitry to detect the bridge voltage when the low-side FET is turned on. Further, a level-shifting circuit can be used to provide a current limit function and to discharge the initial voltage stored on the resonant capacitor before switching the FETs.

Although the present invention has been described with reference to preferred embodiments, workers skilled in the art will recognize that changes may be made in form and detail without departing from the scope of the invention.

What is claimed is:

1. A resonant controller circuit comprising:
   a first control output adapted to couple to a control terminal of a first transistor for providing a first drive signal thereto;
   a second control output adapted to couple to a control terminal of a second transistor for providing a second drive signal thereto;
   a feedback input for receiving a signal; and
   a control circuit configured to control the first and second transistors to drive a resonant load, and to independently control first and second on-times of the first and second drive signals, respectively, in response to receiving the signal to limit a current at an output node.

2. The resonant controller circuit of claim 1, wherein the signal is received from a winding of a transformer coupled to the output node.

3. The resonant controller circuit of claim 1, wherein the signal is received from the output node.

4. The resonant controller circuit of claim 1, wherein the signal comprises a current sense signal;
   wherein the control circuit detects when the current sense signal crosses a threshold current level; and
   wherein the control circuit selectively adjusts at least one of the first on-time and the second on-time to ensure a first current associated with the first transistor crosses a first current threshold and that a second current associated with the second transistor crosses a second current threshold.

5. The resonant controller circuit of claim 4, wherein the first current threshold and the second current threshold are substantially equal.

6. The resonant controller circuit of claim 4, wherein the control circuit is configured to:
   increase the first on-time when the second current does not cross the second current threshold; and
   increases the second on-time when the first current does not cross the first current threshold.

7. The resonant controller circuit of claim 1, wherein the control circuit independently controls the first on-time and the second on-time in response to the signal to limit a peak of the current at the output node.

8. The resonant controller circuit of claim 1, wherein the control circuit is adapted to control the first and second on-times to provide a pre-determined net charging current during a start up process to a resonant load coupled to the output node.

9. The resonant controller circuit of claim 1, wherein the control circuit is adapted to control the first and second on-times to provide current mode control of a resonant load coupled to the output node.

10. A system comprising:
    an output node;
    a first transistor including a first current electrode coupled to a first power supply terminal, a control electrode, and a second current electrode coupled to the output node;
    a second transistor including a first current electrode coupled to the output node, a control electrode, and a second current electrode coupled to a second power supply terminal; and
    a resonant controller circuit including a feedback input coupled to the output node, a first output coupled to the control electrode of the first transistor, and a second output coupled to the control electrode of the second transistor, the controller configured to control the first and second transistors to drive a resonant load, and to detect a signal at the output node and to independently control at least one of a first on-time of the first transistor and a second on-time of the second transistor in response to the signal to limit a current at the output node.

11. The system of claim 10, wherein the resonant controller circuit controls the at least one of the first transistor and the second transistor to provide current limit control of a resonant circuit coupled to the output node.

12. The system of claim 10, wherein, after the resonant controller circuit turns off current flow through the first transistor, the resonant controller circuit independently controls the second on-time to reduce the current to a current threshold level while the second transistor is turned on.

13. The system of claim 10, further comprising a level shift circuit including a first terminal coupled to the output node and a second terminal coupled to the resonant controller circuit, the level shift circuit configured to provide the signal at the output node to the controller.

14. The system of claim 10, wherein the resonant controller circuit comprises:
    a sense transistor including a first current electrode coupled to the output node, a control electrode coupled to the control electrode of the second transistor, and a second current electrode; and a sense resistor including a first terminal coupled to the second current electrode of the sense transistor and a second terminal coupled to the second power supply terminal.

15. The system of claim 14, wherein the resonant controller circuit further comprises:
   a comparator including a first comparator input coupled to the first terminal of the sense resistor, a second comparator input coupled to a reference voltage, and a comparator output for providing an output signal; and
   a timing/logic circuit including an input coupled to the comparator output, a first timing/logic output and a second timing/logic output;
   a level shift circuit including an input coupled to the first timing/logic output, a first level shift output, and a second level shift output coupled to the output node;
   a first driver circuit including a first driver input coupled to the first timing/logic output, a second driver input coupled to the output node, and a driver output coupled to the control electrode of the first transistor; and
   a second driver circuit including a first driver input output coupled to the second timing/logic output and a driver output coupled to the control electrode of the second transistor.

16. The system of claim 10, wherein the resonant controller circuit further comprises a first logic circuitry to provide a normal on-time signal.

17. The system of claim 16, wherein the resonant controller circuit further comprises at least one of a second logic circuitry, a third logic circuitry, and a fourth logic circuitry, wherein:
   the second logic circuitry to provide a peak current time representing a time for the output node substantially to reach a peak current level;
   the third logic circuitry to provide a low-side threshold current time representing a time for the output node to rise from a negative current level to a threshold current level; and
   the fourth logic circuitry to provide a high-side threshold current time representing a time for the output node to decrease from a relatively positive current level to the threshold current level.

18. The system of claim 17, wherein the resonant controller circuit further comprises:
   fifth logic circuitry to compare the low-side threshold current time, the normal on-time, and the peak current time;
   wherein the fifth logic circuitry controls the second on-time according to the low-side threshold current time when the low-side threshold current time is greater than either the normal on-time signal or the peak current time; and
   wherein the fifth logic circuitry controls the second on-time according to a shorter of the normal on-time signal and the peak current time when low-size threshold current time is less than the normal on-time signal and the peak current time.

19. The system of claim 17, wherein the resonant controller circuit further comprises fifth logic circuitry configured to compare the high-side threshold current time, the normal on-time, and the peak current time;
   wherein the fifth logic circuitry controls the first on-time according to the high-side threshold current time when the high-side threshold current time is greater than either the normal on-time signal or the peak current time; and
   wherein the fifth logic circuitry controls the first on-time according to a shorter of the normal on-time signal and the peak current time when high-size threshold current time is less than the normal on-time signal and the peak current time.

20. A method comprising:
   applying a first drive signal to a control electrode of a first transistor and a second drive signal to a control electrode of a second transistor, the first transistor having a first current electrode coupled to a first power supply terminal and a second current electrode coupled to an output node, the second transistor including a first current electrode coupled to the output node and a second current electrode coupled to a second power supply terminal;
   measuring a signal related to a current at the output node; and
   selectively controlling at least one of the first drive signal and the second drive signal to control the first and second transistors to drive a resonant load and to independently control on times of the first and second transistors in response to measuring the signal.

21. The method of claim 20, wherein selectively controlling at least one of the first drive signal and the second drive signal comprises:
   selectively adjusting the first drive signal to control a first on time of the first transistor such that a current at the output node crosses a first threshold during a period of time while current is flowing through the first transistor.

22. The method of claim 20, wherein selectively controlling at least one of the first drive signal and the second drive signal comprises:
   selectively adjusting the second drive signal to control a second on time of the second transistor such that the current at the output node crosses a second threshold during a period of time while current is flowing through the second transistor.

23. The method of claim 20, wherein measuring the signal comprises:
   activating measurement circuitry coupled to the output node when current is flowing through the second transistor to detect the signal; and
   determining a current level associated with the second transistor in response to detecting the signal.

24. The method of claim 23, and further comprising inferring a level of current is flowing through the first transistor in response to detecting the signal associated with the current at the output node during a period of time while current is flowing through the second transistor.

25. The method of claim 20, wherein selectively controlling the first on time of the first transistor and the second on time of the second transistor comprises:
   selectively adjusting durations of one or more pulses of the first drive signal;
   selectively adjusting durations of one or more pulses of the second drive signal; and
   wherein the durations of the one or more pulses of the first and second drive signals are controlled independently to limit a current at the output node.

26. The circuit of claim 7, wherein the signal is a current sense signal, and the resonant control circuit activates the first drive signal until the current sense signal substantially reaches a peak positive inductor current level, and then activates the second drive signal until the current sense signal substantially reaches a peak negative inductor current level.

* * * * *